United States Patent
Roddy et al.

(10) Patent No.: US 9,258,821 B2
(45) Date of Patent: *Feb. 9, 2016

(54) COMMUNICATIONS BASE STATION WITH DECISION FUNCTION FOR DISTRIBUTING TRAFFIC ACROSS MULTIPLE BACKHAULS

(71) Applicant: WI-LAN LABS, INC., San Diego, CA (US)

(72) Inventors: Warren Roddy, Temecula, CA (US); Haibo Xu, San Diego, CA (US); David Gell, San Diego, CA (US); Kenneth L. Stanwood, Vista, CA (US)

(73) Assignee: WI-LAN LABS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,778

(22) Filed: Oct. 8, 2014

(65) Prior Publication Data

US 2015/0024771 A1  Jan. 22, 2015

Related U.S. Application Data

(63) Continuation of application No. 14/161,298, filed on Jan. 22, 2014, now Pat. No. 8,868,085, which is a continuation of application No. 13/937,457, filed on Jul. 9, 2013, now Pat. No. 8,670,772, which is a (Continued)

(51) Int. Cl.
*H04W 72/04* (2009.01)
*H04W 28/08* (2009.01)

(Continued)

(52) U.S. Cl.
CPC .......... *H04W 72/0486* (2013.01); *H04L 47/125* (2013.01); *H04L 47/2475* (2013.01); *H04W 28/08* (2013.01); *H04W 28/085* (2013.01); *H04W 40/04* (2013.01); *H04W 88/10* (2013.01)

(58) Field of Classification Search
CPC .......... H04W 72/0486; H04W 72/082; H04W 84/047; H04W 36/04; H04W 4/22; H04W 52/38; H04W 72/00; H04W 72/085; H04W 88/10

USPC ........ 455/445, 428, 452.1, 452.2, 200.1, 266; 370/252, 237, 465, 468

See application file for complete search history.

(56) References Cited

U.S. PATENT DOCUMENTS 6,944,188 B2  9/2005  Sinha et al.
7,450,948 B2 *  11/2008  Argyropoulos et al. ... 455/452.1

(Continued)

FOREIGN PATENT DOCUMENTS

| CN | 101682567 A | 3/2010 |
| CN | 101959215 A | 1/2011 |
| WO | 2007/106651 A2 | 9/2007 |

OTHER PUBLICATIONS

International Search Report and Written Opinion dated Dec. 3, 2012 issued in PCT/US2012/045703 in 9 pages.

(Continued)

*Primary Examiner* — Minh D Dao
(74) *Attorney, Agent, or Firm* — Procopio, Cory, Hargreaves & Savitch LLP

(57) ABSTRACT

A communication station, such as a base station or access point, has multiple backhaul options and distributes backhaul data between the available backhaul options. The communication station includes a transceiver for transmitting and receiving data with user equipments, multiple backhaul interface modules, and a backhaul distribution module arranged for monitoring demand for backhaul bandwidth and distributing data over the backhauls based on the demand for backhaul bandwidth. Additional modules for user data and control plane processing may be included with the user/control distinction used in distributing data over the backhauls. The backhaul options may include a preferred backhaul and an alternate backhaul. Distributing data over the backhauls may be based, for example, on applications associated with the data, financial cost, delay, robustness, computational resources, and/or additional security associated with using a particular backhaul.

36 Claims, 6 Drawing Sheets

Related U.S. Application Data continuation of application No. 13/367,229, filed on Feb. 6, 2012, now Pat. No. 8,509,787.

(60) Provisional application No. 61/505,262, filed on Jul. 7, 2011.

(51) Int. Cl.
*H04L 12/859* (2013.01)
*H04L 12/803* (2013.01)
*H04W 40/04* (2009.01)
*H04W 88/10* (2009.01)

(56) References Cited

U.S. PATENT DOCUMENTS

| | | | |
|---|---|---|---|
| 7,630,314 B2* | 12/2009 | Dos Remedios et al. | 370/235 |
| 7,640,020 B2* | 12/2009 | Gutowski | 455/452.2 |
| 7,720,094 B2* | 5/2010 | Turner et al. | 370/465 |
| 7,853,265 B1* | 12/2010 | Ahmad | 455/453 |
| 7,948,962 B2* | 5/2011 | Calvert et al. | 370/348 |
| 7,995,493 B2* | 8/2011 | Anderlind et al. | 370/252 |
| 8,130,656 B2* | 3/2012 | Bear et al. | 370/237 |
| 8,219,079 B2* | 7/2012 | Tammisetti | 455/426.1 |
| 8,248,949 B2* | 8/2012 | Ozer et al. | 370/237 |
| 8,385,452 B2* | 2/2013 | Gorokhov | 375/267 |
| 8,509,787 B2* | 8/2013 | Roddy et al. | 455/445 |
| 2005/0159165 A1* | 7/2005 | Argyropoulos et al. | 455/452.2 |
| 2007/0142064 A1* | 6/2007 | Gutowski | 455/456.5 |
| 2007/0218910 A1 | 9/2007 | Hill et al. | |
| 2008/0192773 A1* | 8/2008 | Ou et al. | 370/468 |
| 2009/0059790 A1* | 3/2009 | Calvert et al. | 370/235 |
| 2009/0080333 A1* | 3/2009 | Ozer et al. | 370/237 |
| 2009/0257351 A1 | 10/2009 | Hande et al. | |
| 2010/0157825 A1* | 6/2010 | Anderlind et al. | 370/252 |
| 2010/0165881 A1 | 7/2010 | Hof et al. | |
| 2010/0214977 A1* | 8/2010 | Hegde | 370/328 |
| 2011/0028146 A1* | 2/2011 | Tammisetti | 455/426.1 |
| 2011/0151877 A1 | 6/2011 | Tafreshi | |
| 2011/0211478 A1* | 9/2011 | Calvert et al. | 370/252 |
| 2012/0099438 A1 | 4/2012 | Wang et al. | |

OTHER PUBLICATIONS

IEEE Computer Society. "IEEE Standard for Local and metropolitan area networks—Link Aggregation." IEEE Std. 802.1AX-2008, Nov. 3, 2008, 163 pages.

Office Action and Search Report (with English translation) for related CN Patent Application No. 201280030962.0, mailed on Aug. 25, 2014, in 10 pages.

* cited by examiner

COMMUNICATIONS BASE STATION WITH DECISION FUNCTION FOR DISTRIBUTING TRAFFIC ACROSS MULTIPLE BACKHAULS

CROSS-REFERENCE TO RELATED APPLICATIONS

This application is a continuation of U.S. application Ser. No. 14/161,298, filed Jan. 22, 2014, which is a continuation of U.S. application Ser. No. 13/937,457, filed Jul. 9, 2013, now U.S. Pat. No. 8,670,772, which is a continuation of U.S. application Ser. No. 13/367,229, filed Feb. 6, 2012, now U.S. Pat. No. 8,509,787, which claims the benefit of U.S. Provisional Application No. 61/505,262, filed Jul. 7, 2011, all of which are hereby incorporated by reference.

BACKGROUND

The present invention relates to the field of communication systems and to systems and methods for distributing traffic across multiple backhauls using associated decision criteria.

In a communication network, such as a broadband wireless network, each base station or similar node is connected to the core network via a backhaul connection. Backhaul connections can be implemented using a variety of technologies such as point-to-point (PtP) wireless in a variety of frequencies both licensed and unlicensed, point-to-multipoint (PmP) wireless in a variety of frequencies, Ethernet over copper or fiber optic cable, cable modem, etc. These backhaul technologies can have a variety of capacities, for instance 10 megabits per second (Mbps), 100 Mbps, and 1 gigabit per second are common capacities for Ethernet technologies. Additionally, the backhaul choices may have difference performance or operational costs. For instance one backhaul choice may be owned by the operator of the base station while another may be leased. One backhaul choice may be more or less costly to install or maintain than other choices. Different backhaul choices may have different robustness, such as unlicensed spectrum wireless versus licensed spectrum wireless. Different backhaul choices may lead to additional computational resources being used in the base station such as the need to implement IP-SEC or TR-0069 tunneling over an untrusted backhaul such as a backhaul not owned by the operator of the base station.

SUMMARY

Systems and methods for distributing traffic across multiple backhaul connections to and from a base station are provided. In one aspect, the invention provides a communication station, including: a transceiver arranged for transmitting and receiving data with subscriber stations; a plurality of backhaul interface modules, each backhaul interface module being arranged for providing backhaul communications over a corresponding one of a plurality of backhaul connections; a data processing module for detecting information about applications associated with the data transmitted and received by the transceiver; and a backhaul distribution module coupled to the plurality of backhaul interface modules and arranged for monitoring demand for backhaul bandwidth and distributing data over the plurality of backhaul connections based on the demand for backhaul bandwidth and the detected information about the applications associated with the data.

In another aspect, the invention provides a method for use with a communication station operable to communicate with user equipments via a transceiver and communicate with a network over a plurality of backhaul connections. The method includes: monitoring demand for backhaul bandwidth; distributing backhaul data to a preferred one of the plurality of backhaul connections; detecting information about applications associated with the backhaul data; determining whether the demand for backhaul bandwidth exceeds the capacity of the preferred one of the plurality of backhaul connections backhaul; and distributing at least some of the backhaul data to an alternate one of the plurality of backhaul connections when the demand for backhaul bandwidth exceeds the capacity of the preferred one of the plurality of backhaul connections, the backhaul data distributed to an alternate one of the plurality of backhaul connections being selected utilizing the detected information about the applications associated with the backhaul data.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
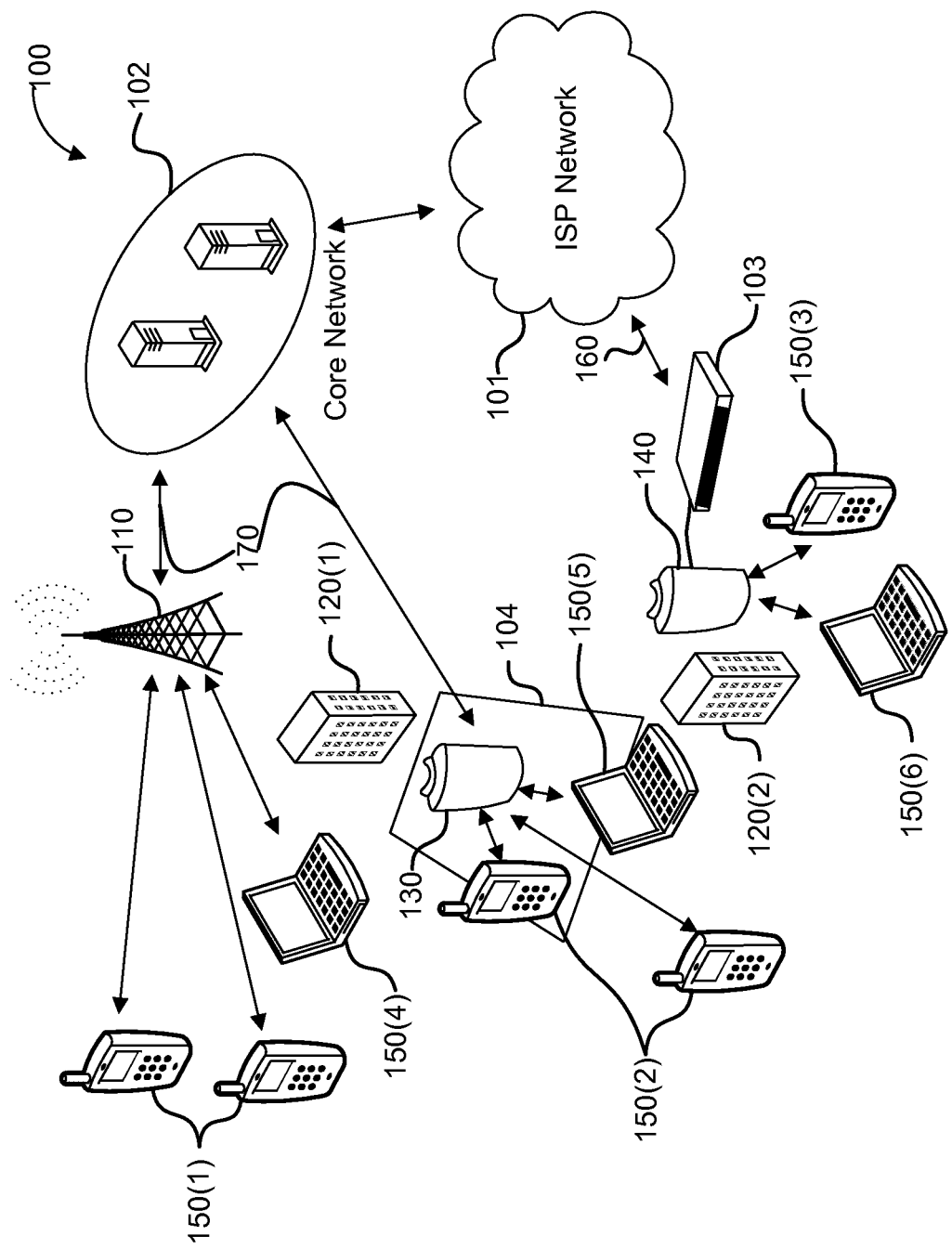
FIG. 1 is a block diagram of a wireless communication network in which the systems and methods disclosed herein can be implemented according to an embodiment.

A base station with multiple backhaul choices which uses a method with a decision function, such as a cost function, to distribute backhaul traffic across the multiple backhaul choices is provided. The base station disclosed herein can be used with backhaul technology that connects the base station to the core network for the purpose of transporting either user plane data or control plane data or both. Embodiments have two or more backhaul choices available to them. Some embodiments have a primary or preferred backhaul choice and one or more alternative backhaul choices. Some embodiments use a decision function to determine when to use one backhaul choice preferentially to another or when to use an alternate backhaul choice in addition to a preferred backhaul choice. Some embodiments use a decision function to determine the quantity of data to transport over a preferred backhaul choice and an alternate backhaul choice. Some embodiments classify data traffic into groupings that are better suited to be transported over a preferred or an alternative backhaul. Some embodiments detect information about applications associated with the data traffic and use the application information in the backhaul decision function. A base station may, for example, inspect packets to determine application classes and/or specific applications associated with the packets.

The decision function may have many embodiments dependent, for example, upon the available backhaul choices. Different backhaul options may have different capacities. Different backhaul options may have different levels of robustness causing one option to be more likely to transport data error free. Different backhaul options may have different computational costs. For instance, one backhaul choice may be untrusted and require additional security procedures, such as IP-SEC, to avoid security breaches. This additional security may require additional computational resources. A base station may not have sufficient computational resources to apply the enhanced security to the peak data rate and, therefore must analyze the resource cost of using the backhaul which requires the extra security. Different backhaul choices may use differing amounts of other resources, for example, electricity. Different backhaul choices may have different rate tariffs, for instance if two different backhaul choices are owned by different operators. Different backhaul choices may have different delay characteristics or other differing performance characteristics that may be used in a cost function.

The aforementioned inputs to the decision function may be static, dynamic or some combination of the two. The robustness of a backhaul option may vary over time due to the conditions of the backhaul transmission channel. The performance characteristics of a backhaul option such as capacity and delay may vary over time due to, for example, the current usage of this backhaul option by other systems. The rate tariffs may also vary over time due to the specific rate tables implemented by a backhaul service provider.

The systems and methods disclosed herein can be applied to base stations or similar nodes, such as a cable head end, in various communication systems, including but not limited to wireline and wireless technologies. For example, the systems and methods disclosed herein can be used with Cellular 2G, 3G, 4G (including Long Term Evolution ("LTE"), LTE Advanced, WiMax), WiFi, Ultra Mobile Broadband ("UMB"), cable modem, and other wireline or wireless technologies. Although the phrases and terms used herein to describe specific embodiments can be applied to a particular technology or standard, the systems and methods described herein are not limited to these specific standards.

FIG. 1 is a block diagram of a wireless communication network in which the systems and methods disclosed herein can be implemented according to an embodiment. FIG. 1 illustrates a typical basic deployment of a communication system that includes macrocells, picocells, and enterprise femtocells. In a typical deployment, the macrocells can transmit and receive on one or many frequency channels that are separate from the one or many frequency channels used by the small form factor (SFF) base stations (including picocells and enterprise or residential femtocells). In other embodiments, the macrocells and the SFF base stations can share the same frequency channels. Various combinations of geography and channel availability can create a variety of interference scenarios that can impact the throughput of the communications system.

FIG. 1 illustrates an example of a typical picocell and enterprise femtocell deployment in a communications network 100. Macro base station 110 is connected to a core network 102 through a backhaul connection 170. Subscriber stations 150(1) and 150(4), or user equipment (UE) using LTE terminology, can connect to the network through macro base station 110. In the network configuration illustrated in FIG. 1, office building 120(1) causes a coverage shadow 104. Pico station 130, which is connected to core network 102 via backhaul connection 170, can provide coverage to subscriber stations 150(2) and 150(5) in coverage shadow 104.

In office building 120(2), enterprise femtocell 140 provides in-building coverage to subscriber stations 150(3) and 150(6). Enterprise femtocell 140 can connect to core network 102 via ISP network 101 by utilizing broadband connection 160 provided by enterprise gateway 103.

Figure 2:
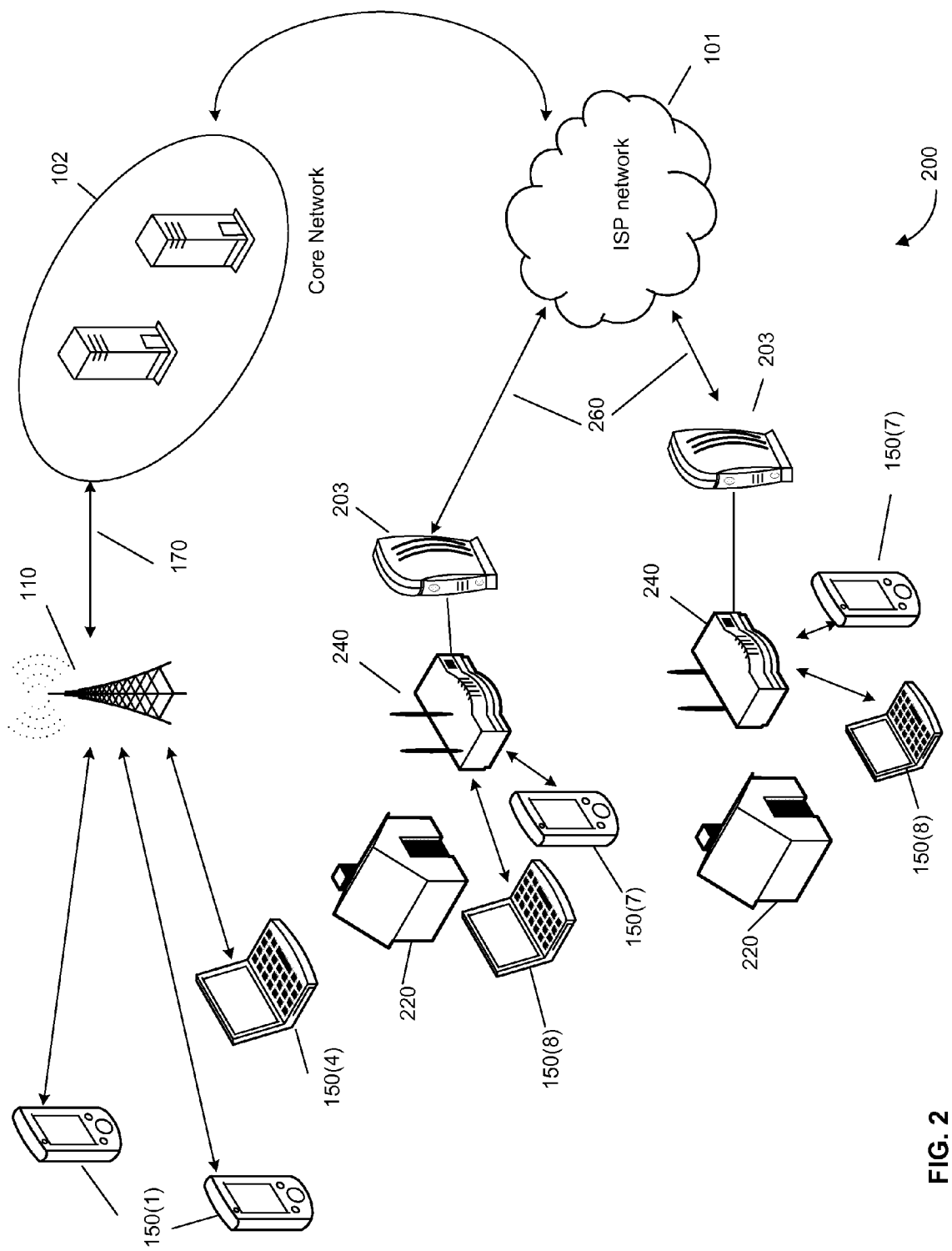
FIG. 2 is block diagram of another wireless communication network in which the systems and methods disclosed herein can be implemented according to an embodiment.

FIG. 2 is a block diagram of another wireless communication network in which the system and methods disclosed herein is implemented according to an embodiment. FIG. 2 illustrates a typical basic deployment in a communications network 200 that includes macrocells and residential femtocells deployed in a residential environment. Macrocell base station 110 is connected to core network 102 through backhaul connection 170. Subscriber stations 150(1) and 150(4) can connect to the network through macro base station 110. Inside residences 220, residential femtocell 240 can provide in-home coverage to subscriber stations 150(7) and 150(8). Residential femtocells 240 can connect to core network 102 via ISP network 101 by utilizing broadband connection 260 provided by cable modem or DSL modem 203.

Backhauls 170, 160, and 260, in both wireline and wireless forms, have a maximum and sometimes variable capacity for backhauling the traffic to and from a particular base station 110, 130, 140, or 240, and therefore demand for backhaul resources may exceed capacity. This congestion effect may occur for both wired and wireless network base stations and when using either wired or wireless backhaul technology.

Figure 3:
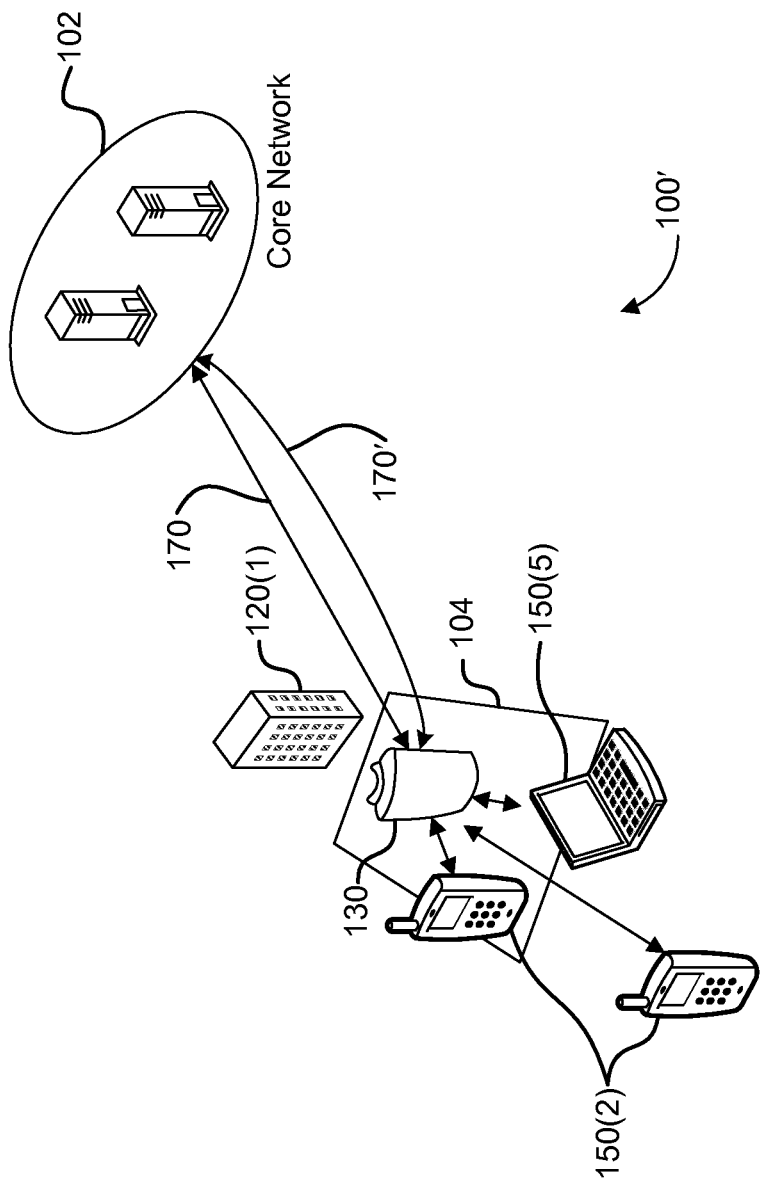
FIG. 3 is a block diagram of a subset of the wireless communication system of FIG. 1 in which a base station has multiple backhaul options available.

FIG. 3 is a block diagram of a subset 100' of the wireless communication system of FIG. 1 in which a base station has multiple backhaul options available. In this embodiment, the base station is pico station 130 which now has a backhaul connection 170 and an alternative backhaul option 170'. Both backhaul options connect the pico station to core network 102. While FIG. 3 depicts the concept of multiple backhauls with respect to pico station 130 and backhaul connection 170, one skilled in the art will understand that the invention herein would apply for macro station 110, as well. Similarly, enterprise femtocell 140 may have multiple backhaul options such as a dialup line as an alternative to the broadband connection 160 provided by enterprise gateway 103 or may have an alternate broadband connection provided by an alternate gateway. Residential femtocell 240 may also have multiple backhaul options such as a dialup line as an alternative to the broadband connection 260 provided by a cable modem or DSL modem 203 or may have an alternate broadband connection provided by an alternate modem, for instance it may be able to choose between the broadband connections provided by both a cable modem and a DSL modem. Although depicted as a single PtP connection, the term "backhaul" as used herein may also refer to a communication path involving multiple hops, connected end-to-end in a serial fashion, each of which uses different technologies. For example, a backhaul connection may consist of a licensed-band wireless link plus an Ethernet over fiber link. Additionally, a base station may have multiple backhaul connections of the same type. While FIG. 3 depicts a base station with two backhaul connections, other stations with multiple backhauls may have more than two backhaul connections.

Figure 4:
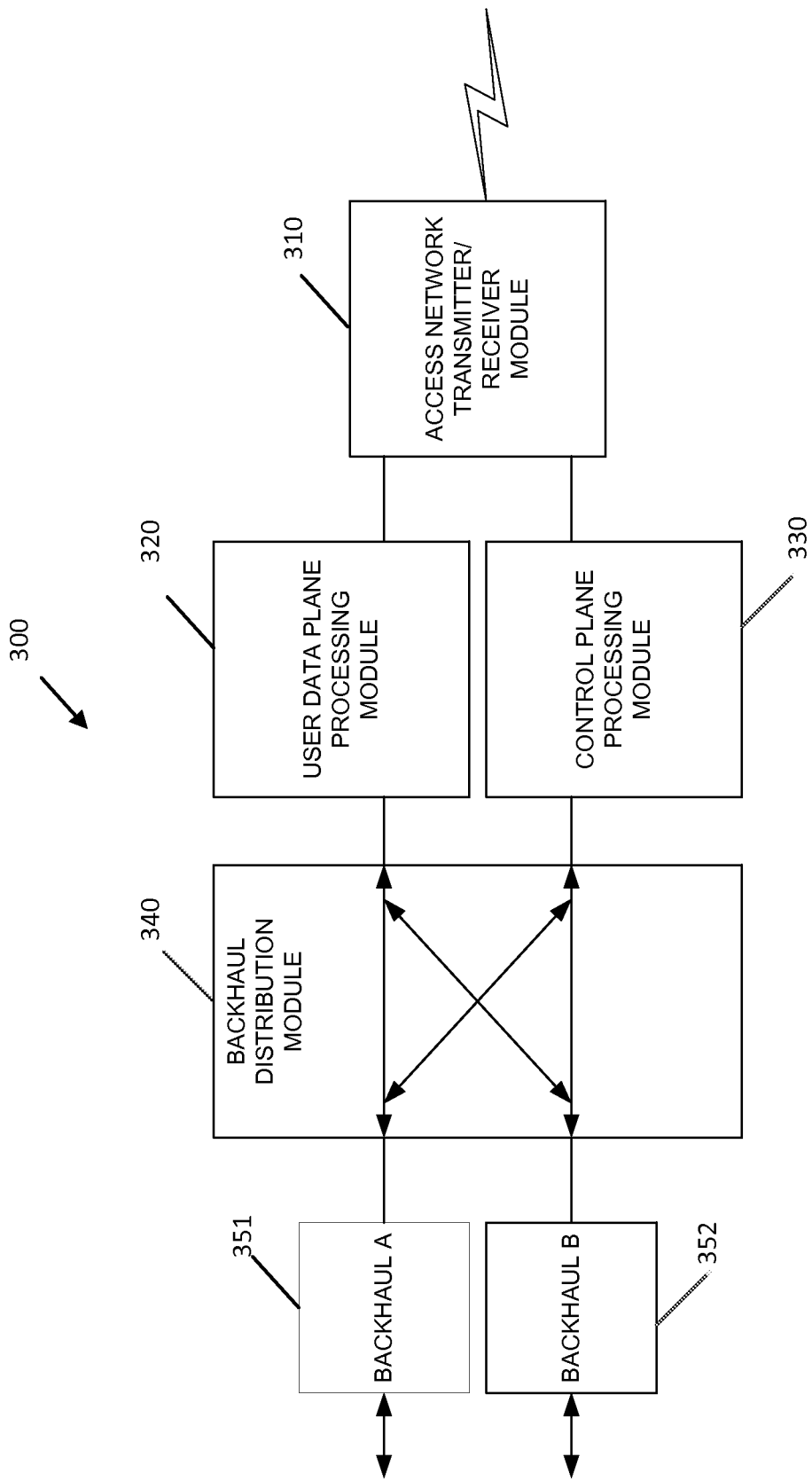
FIG. 4 is a functional block diagram of a station according to an embodiment.

FIG. 4 is a functional block diagram of a station 300. In some embodiments, the station 300 is a wireless or wireline network node, such as a base station, an LTE eNB, a cable head end, or other network node (e.g., the macro base station 110, pico station 130, enterprise femtocell 140, enterprise gateway 103, or residential femtocell 240 shown in FIGS. 1, 2, and 3). The station 300 comprises a user data plane processing module 320 and a control plane processing module 330 both communicatively coupled to an access network transmitter receiver module (or transceiver) 310 and to a backhaul distribution module 340. The backhaul distribution module 340 is further communicatively coupled to backhaul A 351 and backhaul B 352. In one embodiment, the modules in station 300 are coupled via control logic.

The transmitter receiver module 310 is configured to transmit and receive communications with other devices such as subscriber stations 150. In one embodiment, the communications are transmitted and received wirelessly. In another embodiment, the communications are transmitted and received over wire. In one embodiment, the transmitter receiver module includes a modem, an antenna and a radio.

The user data plane processing module 320 is configured to process user data communications being received and transmitted by the station 300. In an embodiment, the user data plane processing module 320 analyzes application classes and/or specific applications of the data communications being received and transmitted by the station 300.

The user data plane processing module 320 may inspect each packet to detect the application information including the application class and specific application. Some example application classes are 2-way video conferencing, unidirectional streaming video, online gaming, and voice. Specific applications refer to the particular software used to generate a data stream. Some example specific applications are Youtube, Netflix, Skype, and iChat. Each application class can have numerous specific applications. In an embodiment, additional application information, such as a video codec used, a frame rate, and a frame size, is also detected for some application types. Further, application information may include transport information, for example, allowing the backhaul distribution module 340 to distinguish data for video transported using TCP from video transported using UDP.

In an embodiment, the application class and specific application can be detected by inspecting IP source and destination addresses. The user data plane processing module 320 can perform a reverse domain name system (DNS) lookup or Internet WHOIS query to establish the domain name and/or registered assignees for the IP addresses. The domain name and/or registered assignee information can be used to establish both application class and specific application for the data stream based on a priori knowledge of the domain or assignee's purpose. For example, if traffic with a particular IP address yielded a reverse DNS lookup or WHOIS query that included the name 'Youtube' then this traffic stream could be considered a unidirectional video stream (application class) using the Youtube service (specific application).

The application class and specific application can also be detected by inspecting an HTTP header. For example, the 'Host' field in the HTTP header typically contains domain or assignee information which, as described in the embodiment above, is used to map the stream to a particular application class or specific application. For another example, the 'Content Type' field in an HTTP packet can be inspected for information regarding the type of payload.

The application class and specific application can be detected for some packets by inspecting other packets. For example, the user data plane processing module 320 may inspect a protocol sent in advance of the data stream. The application class or specific application may be detected based on the protocol used to set up or establish a data stream instead of identifying this information using the protocol used to transport the data stream. For example, Real Time Streaming Protocol (RTSP) packets can be used to establish multimedia streaming sessions. Information sent from a client to a server to set up a multimedia streaming session can be used when processing the streaming data sent from the server to the client. Additionally, information about an RTSP streaming session, such as the current playback time and requested range of playback times, can be used to determine current bandwidth demand and predicted future bandwidth demand.

Although the embodiment illustrated in FIG. 4 has a user data plane processing module 320 and a control plane processing module 330 that are distinct, another embodiment may have a combined data processing module. Additionally, the detection of application information may be performed in a module other than the user data plane processing module 320, for example, a packet inspection module. Example apparatuses and methods for detecting application information are described in U.S. patent application Ser. No. 13/236,308, filed Sep. 19, 2011, which is hereby incorporated by reference.

The control plane processing module 330 is configured to process control communications being received and transmitted by the station 300. These may be control communications such as from an LTE Mobility Management Entity (MME) or Element Management System (EMS) directed at controlling the actions of the station 300 or may be control communications from entities such as an MME or EMS directed at controlling the actions of devices with which the base station communicates via access network transmitter receiver module 310, such as subscriber stations 150.

The backhaul distribution module 340 determines which data plane and control plane communications, if any, will be transported to the core network 102 via backhaul A 351 or via backhaul B 352. The station 300 includes backhaul interface modules to provide communications over backhaul A and backhaul B. For concise description, transporting data via one of the backhaul interface modules and the associated backhaul connection may be referred to simply as using backhaul A or backhaul B.

In one embodiment, station 300 may be an LTE picocell capable of transmitting wirelessly towards user stations at peak rates of 150 Mbps and receiving from user stations at peak rates of 70 Mbps. Since the uplink cannot exceed a sustained rate of 70 Mbps, and variable channel conditions will likely keep the average sustained downlink data rate below 100 Mbps, it is reasonable to backhaul such a station with a 100 Mbps full duplex Ethernet link. However, in addition to user data and control data destined for user equipment 150, the backhaul in the direction towards an LTE picocell may contain control data destined for the picocell itself and not governed by the over the air limitation of 150 Mbps. While this data is generally small, it can be large, for example, when new software is downloaded to the picocell by an EMS entity for later use. Additionally, since data rates in the core network can exceed those over an LTE air link, the peak demand for bandwidth to send data to the picocell may be greater than the 150 Mbps air link rate. So, while 100 Mbps may be sufficient for average demand for backhaul capacity towards the picocell, it may be insufficient to handle the peak demand for backhaul bandwidth.

In the above embodiment, if peak demand for backhaul capacity exceeds the capacity of the backhaul there may be three solutions. First, assuming the average demand for backhaul bandwidth is less than the capacity of the backhaul, data may be delayed until demand subsides. However, this delay may be too long to preserve the quality of user experience, especially for services such as voice and video, and it may take a very long time for the demand to reduce to less than the link capacity if the average backhaul demand is normally close to link capacity. Second, the original 100 Mbps Ethernet link could be replaced (either at installation, by design, or after the fact, by necessity) with a gigabit Ethernet link. However, a gigabit Ethernet link may be much more expensive to install and operate and provides more than six times the necessary peak capacity. A third option is to provide a second backhaul, backhaul B 352, that is sized to address some or all of the excess backhaul capacity needs.

In an embodiment that contains multiple backhauls, backhaul distribution module 340 determines when to use backhaul A and when to use backhaul B and determines which data should be transported over backhaul A and which data should be transported over backhaul B. In combination, these decisions also determine how much data is transported over backhaul A and how much data is transported over backhaul B. These decisions may be in response to backhaul congestion, i.e. backhaul demand exceeding backhaul capacity, may be in response to anticipated backhaul congestion, or may be based on an ongoing policy that always places certain data on backhaul A while always placing certain other data on backhaul B. The methods by which data is directed on one backhaul or another may vary depending upon whether the base station is receiving the data on the backhaul or transmitting data on the backhaul.

There are many factors that may make one backhaul, backhaul A 351, more or less attractive than another backhaul, backhaul B 352, for some, all, or certain data. In one embodiment, backhaul A may have a different financial cost associated with the transport of a specific quantity of data than backhaul B. For instance, backhaul A may be owned and operated by the owner of station 300 while backhaul B may be owned and operated by another entity that charges based on usage, e.g., the number of bytes transported. When one backhaul has a higher financial cost associated with use, it would be desirable to minimize the use of the higher cost backhaul.

In another embodiment, backhaul A may have different delay than backhaul B. For instance if backhaul B were a satellite link and backhaul A were not, backhaul B may have substantially more delay and would be less desirable. Similarly, in an embodiment where backhaul B is a shared link and backhaul A is a dedicated link, backhaul B may both have more delay and less deterministic throughput making it less desirable than backhaul A. Detected application information may additionally be used in deciding what data to communicate on backhaul A and what data to communicate on backhaul B. For example, data for a video streaming application may preferentially use a backhaul with lower delay.

If, in an embodiment, backhaul B were implemented using a technology that used unlicensed spectrum, such as an unlicensed spectrum point-to-point link or an unlicensed spectrum point-to-multipoint or mesh technology such as 802.11a WiFi, and backhaul A used a wireline or licensed spectrum technology, backhaul B may be less robust to interference and errors and therefore less desirable than backhaul A.

In another embodiment, backhaul A may require different computational resources than backhaul B. For instance, backhaul A may be owned and operated by the owner of station 300 while backhaul B may be owned and operated by another entity. In this scenario, backhaul B may be untrusted and may require the application of additional security, such as IP-SEC. Such additional security may require substantial resources. The station 300 may only have sufficient resources to apply the additional security to a fraction of the data transported over the backhaul. Additionally, the need for additional computational resources may cause the station 300 to consume more electrical power, increasing operational expenses and reducing the mean time to failure of the device.

Figure 5:
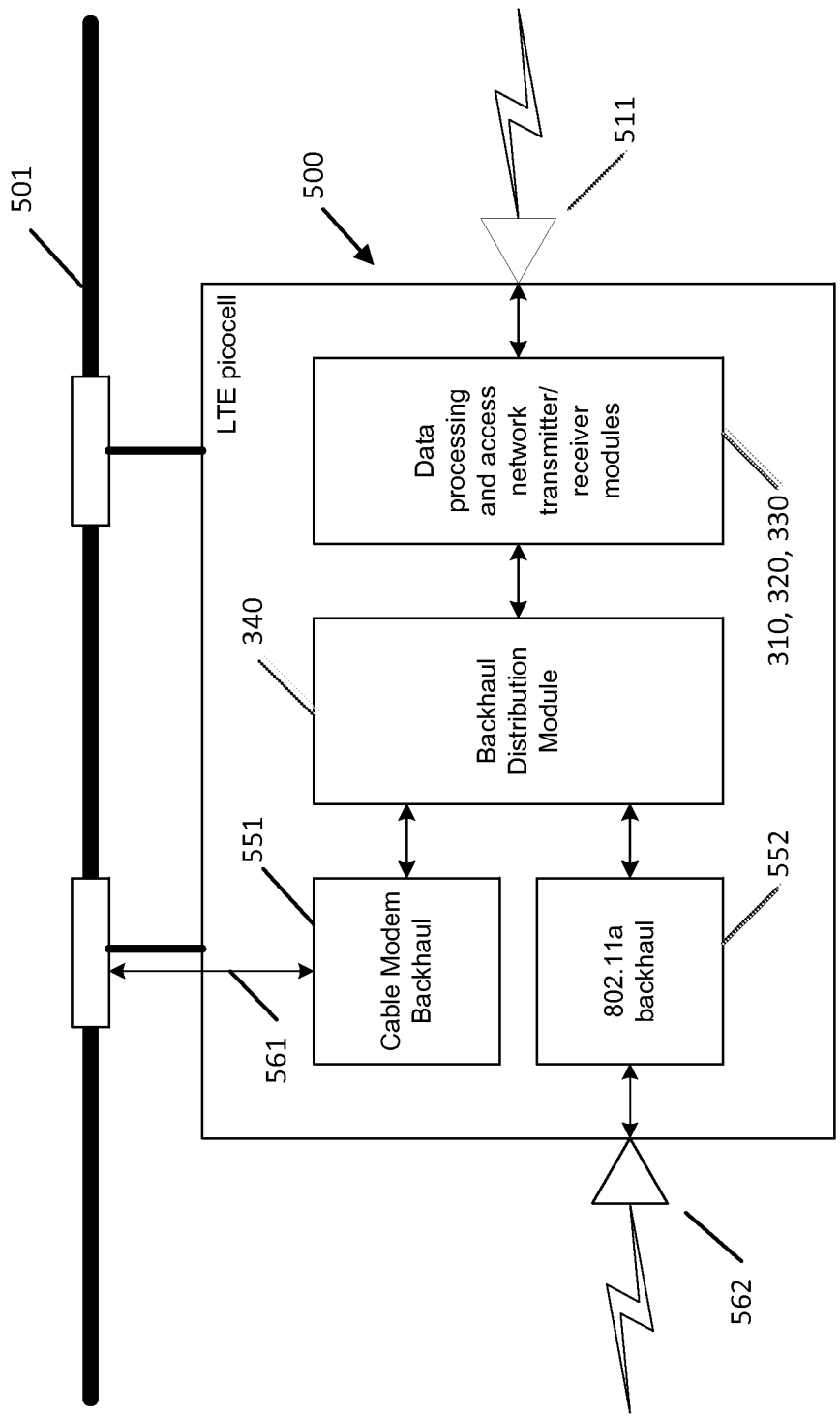
FIG. 5 is a functional block diagram of an LTE picocell with multiple backhauls.

FIG. 5 is a functional block diagram of an LTE picocell 500 that is an embodiment of station 300 of FIG. 4. Picocell 500 is mounted on cable strand 501. Cable strand 501 provides physical support to the LTE picocell and may also provide power. Alternatively, power can be provided from another source, such as solar power or batteries. Cable strand 501 also provides communication path 561 which is accessible via cable modem technology. Picocell 500 contains two backhaul options. Cable Modem backhaul 551 provides backhaul over communication path 561 and ultimately over the cable strand 501 using cable modem technology such as the well-known Data-Over-Cable Service Interface Specification (DOCSIS) standard. 802.11a backhaul 552 provides wireless backhaul using technology based on the Institute of Electrical and Electronics Engineers (IEEE) Wireless Local Area Network (LAN) specifications and may use point-to-point, point-to-multipoint, or mesh variants of the IEEE 802 technology. 802.11a backhaul 552 uses one or more antennas 562 to transmit and receive backhaul data.

Backhaul distribution module 340 determines which services or data are transported over the cable modem backhaul or the 802.11a backhaul. Cable modem backhaul 551 may be the preferred backhaul for LTE picocell 500. The cable modem backhaul may provide more robust and reliable transport of data than 802.11a backhaul 552 which operates using unlicensed spectrum and generally follows a listen-before-talk protocol which allows for data collisions. Additionally, if the picocell is operated by the cable operator in control of cable strand 501, transport of data using the cable modem backhaul may be more trusted than the 802.11a backhaul and, therefore, require less security to be implemented. Alternatively, 802.11a backhaul may be preferred if the picocell operator is not the cable strand operator. In this case, the trust level may be the same and there may be a lower financial cost associated with transporting data on the 802.11a backhaul compared to the cable modem backhaul.

Figure 6:
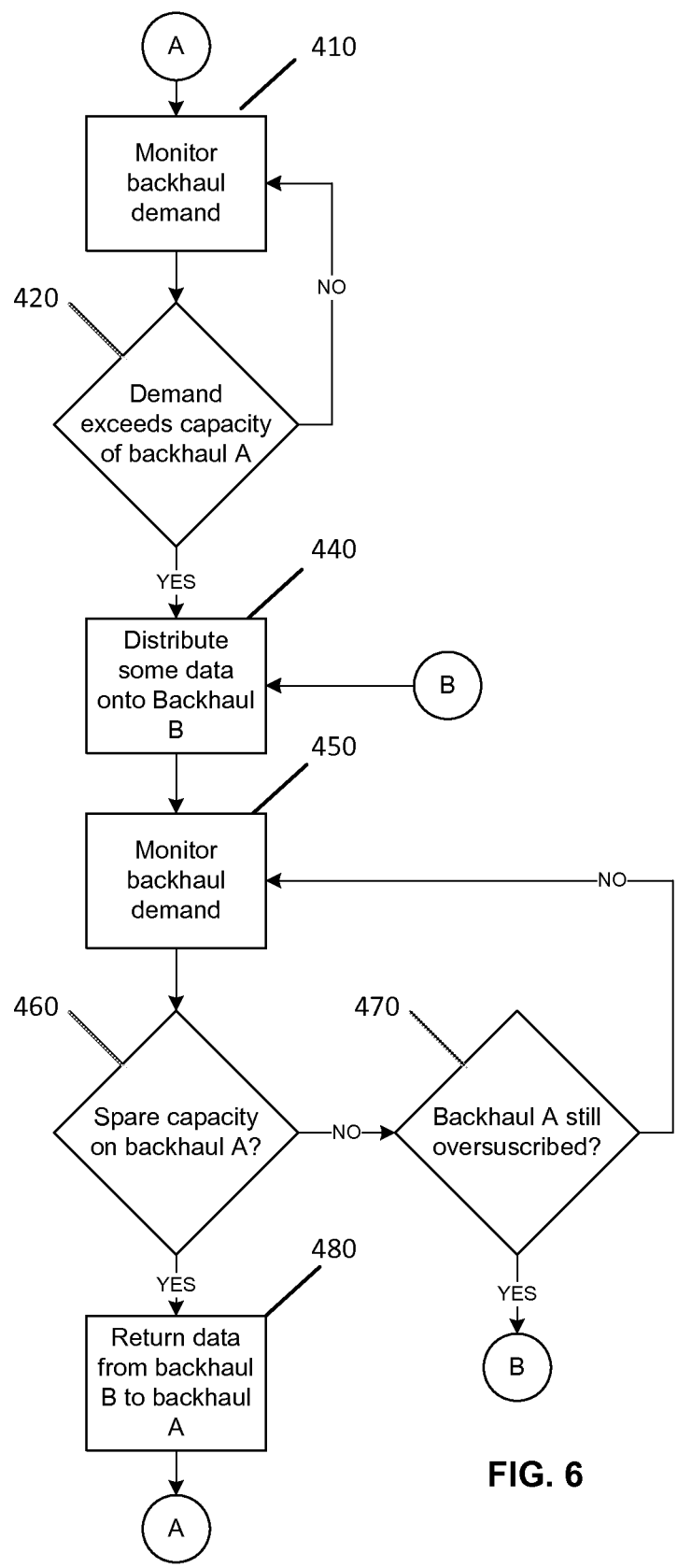
FIG. 6 is a flow diagram for a method for determining when to use an alternate backhaul.

FIG. 6 is a flow diagram for a method for determining when to use an alternate backhaul in an embodiment where backhaul A is always preferable to backhaul B. Even though the flow diagram of FIG. 6 shows such an embodiment, alternate embodiments exist where backhaul A may be preferable for certain data while backhaul B is preferable for other data. The logic of the flow diagram of FIG. 6 may be implemented, for example, in backhaul distribution module 340 of station 300. Flow starts at step 410, where the station is monitoring the demand for bandwidth on the backhaul. The monitoring can be implemented by numerous methods. In one embodiment, the monitoring is implemented by summing the guaranteed bit rates or the maximum bit rates of services that are currently active or some function of these bit rates. In an alternative embodiment, the monitoring is performed by measuring traffic on the backhaul and predicting future bandwidth demand based on previous bandwidth demand. The monitoring can be done real time on a per packet basis. It can also be performed on a fixed or variable time interval basis. If the backhaul uses a technology that may provide variable bandwidth, such as a wireless link implementing adaptive modulation and coding, the monitoring step 410 can be enhanced to also monitor the capacity of the backhaul in addition to the demand for backhaul bandwidth. Allowance may be made for extra bandwidth demand created by service related retransmissions over the backhaul such as those caused by an automatic retry request (ARQ) mechanism as can be found in transmission protocols such as the well-known transmission control protocol (TCP). Allowance may also be made for backhaul bandwidth availability reduction due to backhaul transmission technology ARQ or hybrid-ARQ (HARQ).

At decision block 420, a determination is made whether demand for backhaul bandwidth exceeds the capacity of backhaul A 351. In one embodiment, demand is determined to exceed capacity if demand exceeds capacity for any amount of time however short, to avoid any delay due to data waiting to be transmitted over the backhaul. In an alternative embodiment, some amount of delay may be tolerated, in which case demand for backhaul bandwidth is deemed to exceed backhaul capacity if the demand exceeds the capacity by a specific amount of bandwidth for at least a certain amount of time. If at step 420, it is determined that demand does not exceed capacity, flow returns to step 410 where monitoring is continued. If, however, at step 420 it is determined that demand does exceed the capacity of backhaul A, flow proceeds to step 440 where some data is distributed onto backhaul B 352.

From step 440, flow continues to step 450 where the station monitors demand for backhaul bandwidth and, depending on the backhaul technology, monitors backhaul capacity. Step 450 is similar to step 410, except in some embodiments it is preferable to not only monitor for situations where data or services must be offloaded to backhaul B, but also monitor for situations where data or services may be returned to backhaul A.

At decision point 460, a determination is made whether there is spare capacity on backhaul A. If there is spare capacity on backhaul A, flow proceeds to step 480 where data or services are returned to backhaul A. From step 480, flow returns back to step 410 to monitor backhaul demand. Alternatively, if some but not all data or services were returned to backhaul A, flow could proceed back to step 450 instead of step 410. If at step 460 there was no spare capacity on backhaul A, flow proceeds to decision point 470 where a determination is made whether backhaul A is still oversubscribed such that demand for bandwidth by the services and data still transported over backhaul A still exceeds the capacity of backhaul A. If at step 470 it is determined that backhaul A is still oversubscribed, flow returns to step 440 to distribute more data or services onto backhaul B. If at step 470 it is determined that backhaul A is not oversubscribed, flow returns to step 450 where the bandwidth demands and backhaul capacity are monitored.

When data is distributed onto an alternate backhaul, as in step 440 of FIG. 6, the decision of what data to transport over the alternate backhaul can have many factors. One factor may be the type of data. The type of data may be based on detecting information about applications associated with the data. For instance, real-time data such as voice or video may be preferentially transported over the lower latency backhaul option, allowing email, file transfer, and other services less sensitive to latency to be carried over a higher latency backhaul option. Similarly, data that is error tolerant, such as data transmitted with a transport protocol such as TCP that incorporates an ARQ function may be transmitted over a less reliable unlicensed spectrum wireless backhaul while data that cannot tolerate errors or cannot tolerate the delay caused by retransmissions may be transported on a less error-prone backhaul alternative such as wired Ethernet or a licensed spectrum wireless backhaul.

The choice of which data to distribute onto alternate backhauls may also be impacted by the technology deployed by station 300. For instance, if station 300 is a pico station implementing LTE technology, data to and from a specific piece of user equipment is segregated onto one or more logical bearers between a data gateway and the user equipment. The pico station may have little visibility into the data within the bearer but may know information such as guaranteed or maximum bit rates. In this embodiment, the pico station can cause the bearers to be set up distributed across alternative backhauls on a bearer by bearer basis with all data transported in an individual bearer transported on the same backhaul option. In an alternate embodiment, the decision to distribute data traffic across alternate backhaul options could occur on a user equipment basis with all data for an individual user equipment instance transported on the same backhaul option.

For example, each end user device may be assigned a unique Internet Protocol (IP) address. IP routing functions within the pico station (for example, implemented in backhaul distribution module 340) and gateway devices may be used to distribute uplink traffic streams across alternate backhaul options based upon the user IP address basis. The routing decision may be based upon the minimization of a cost function which continuously gathers the environmental parameters described herein such as available capacity, tariff, transport reliability or other measures. These environmental parameters may be collected locally by the device itself or by receiving signaling messages sent by a device on the other side of the backhaul. For example, the core network gateway 102 may collect information on the current state of congestion across links 170 and 170' using internal methods as well as collect congestion information signaled from pico station 130. One skilled in the art would recognize that in addition to distribution based upon IP addresses, distribution may be based on IP sockets, port numbers or Ethernet Media Access Control (MAC) addresses.

Other embodiments may use technology that would allow packet by packet distribution of data on alternate backhauls. This may be accompanied by packet inspection that allows data to be distributed across backhaul options based on service type or application type.

Once a distribution choice has been made, different embodiments may have more or less ability to redistribute data. For instance, it may be difficult to move an LTE bearer from one backhaul to another, so it may be preferable to make the decision to distribute a bearer onto an alternative backhaul at bearer creation and to not move it during the life of the bearer at a pico station. However, if the gateway allows, the path a bearer takes between the gateway and the pico station may be changed to route the bearer and its data over a different backhaul. Similarly, in some embodiments, the choice of backhaul option to support an individual user equipment instance may be made at the point when the user equipment enters the network or connects with the pico station.

There are many ways to redistribute all or part of data to different backhauls depending on the network architecture of the base station. For the most common case where backhaul data is transported as IP packet payload across different backhaul IP networks, as long as the backhaul data IP packets reach the intended backhaul destination (e.g. MME/SGW in a LTE network), the redistribution of data by the base station to different backhaul networks is transparent to the backhaul destination.

A base station with multiple backhaul networks is a multi-homed node attached to multiple computer networks. Standard and proprietary routing protocols can be used for the multi-homed base station to notify the routers on the connected backhaul networks how packets destined for the LTE downlink should be delivered to the base station. In an embodiment, backhaul distribution module 340 can signal one or more routers in core network 102 with updates to their static routing tables thereby adjusting the flow of downlink packets based on end-user IP address. Updates may be communicated using standard protocols such as Simple Network Management Protocol (SNMP), Hyper-Text Transport Protocol (HTTP), Telnet or Secure Shell (SSH). Alternatively, updates may be communicated via a proprietary protocol. In an alternative embodiment, backhaul distribution module 340 can send Border Gateway Protocol (BGP) route update messages to the routers in core network 102. The route update messages can contain different LOCAL_PREF attributes for different backhaul networks according to the base station's preference. The neighbor routers on the backhaul networks will route the packets to the backhaul network with the highest LOCAL_PREF value. The base station can also send route update messages with different AS_PATH attributes for different backhaul networks, and the neighbor routers on the backhaul networks will route packets to the backhaul network with the shortest AS_PATH. The base station can also send route update messages containing Multi-Exit Discriminator (MED) values for different backhaul networks, and the neighbor routers on the backhaul networks will route the packets to the backhaul network with lower MED values.

Proprietary routing protocols can also be used between the base station and the routers on multiple backhaul networks. For example, a proprietary protocol can be a protocol similar to BGP but with support of per UE tunnel routing. A base station can send route update messages to neighbor routers containing different weights for different tunnels on different backhaul networks. Alternatively, a base station can send route update messages to neighbor routers containing static route information for different tunnels. A router that implements the proprietary protocol can route packets for different UE tunnels to different backhaul networks.

There are multiple ways to configure the base station's uplink routing engine to distribute all or part of data IP packets to a different backhaul network. For a base station with multiple backhaul IP networks, the simplest approach is to change the default route of the base station routing engine to the desired backhaul network, for instance the one with lowest cost, and effectively use only the selected backhaul network as the default route. This simple approach is quite effective for a fixed point to multiple point WiMAX network where different subscriber stations are assigned different IP addresses and the WiMAX base station serves as a router between the subscriber's IP network and the backhaul IP networks. A slightly more advanced approach could be assigning different weights to different backhaul networks, and the routing engine in the base station can distribute data across all the backhaul networks according to the weight and favor some backhaul networks over others.

For base stations that can provide different QoS to different users and different types of traffic, a more advanced routing engine that support dynamic routing on a per packet basis can be used to distribute traffic from different users or different type of services to different backhaul networks. For example, in an LTE pico station, IP packets from different bearers can be inspected and marked with different tags according to the tunnel ID of the eGTP-U tunnels between different UEs and the MME/SGW on the core network. In a WiMax base station, IP packets from different subscribers and service flows can be inspected and marked with different tags according to service flow identifiers. Once packets are marked with different tags, the routing engine can route the IP packets to different backhaul networks according to the tags associated with the IP packets on a per packet basis.

Those of skill will appreciate that the various illustrative logical blocks, modules, controllers, and algorithm steps described in connection with the embodiments disclosed herein can be implemented as electronic hardware, computer software, or combinations of both. To clearly illustrate this interchangeability of hardware and software, various illustrative components, controllers, blocks, modules, and steps have been described above generally in terms of their functionality. Whether such functionality is implemented as hardware or software depends upon the particular system and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one unit, module or block without departing from the invention.

The various illustrative logical blocks, controllers, and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A network node in a communication network, the network node comprising:
a processor for executing instructions; and
a memory, coupled to said processor, the memory storing computer-executable instructions which, when executed by the processor, perform steps comprising:
providing backhaul communications via a plurality of backhaul interfaces of the network node over a plurality of backhaul connections, each backhaul interface supporting backhaul communication over a corresponding backhaul connection;

receiving, via an interface of the network node that is coupled to one or more data processing modules, application information from the one or more data processing modules, the application information being associated with data processed by the one or more data processing modules; and distributing, via the plurality of backhaul interfaces, data over the plurality of backhaul connections based at least in part on the received application information.

2. The network node of claim 1, wherein computer-executable instructions further perform the step of monitoring a current backhaul demand level for backhaul bandwidth, and wherein the distribution of data over the plurality of backhaul connections is further based on the current backhaul demand level.

3. The network node of claim 2, wherein the monitoring step further determines whether the current backhaul demand level exceeds a total backhaul bandwidth.

4. The network node of claim 3, wherein the determination of whether the current backhaul demand level exceeds a total backhaul bandwidth is based on whether the current backhaul demand level exceeds a total backhaul bandwidth by a threshold amount for a threshold time duration.

5. The network node of claim 3, wherein, if it is determined that the current backhaul demand level exceeds the total backhaul bandwidth, the distribution of data over the plurality of backhaul connections is further based on minimization of a cost function associated with communications on each of the plurality of backhaul connections.

6. The network node of claim 2, wherein the current backhaul demand level is based on at least one of the received application information, a guaranteed bit rate, or a maximum bit rate associated with data transmitted to and received from a plurality of subscriber stations.

7. The network node of claim 2, wherein the computer-executable instructions further perform the steps of:
  initially distributing data to a preferred one of the plurality of backhaul interfaces;
  determining, in the monitoring step, whether the current backhaul demand level exceeds a total backhaul bandwidth capacity of one of the backhaul connections that is associated with the preferred one of the plurality of backhaul interfaces; and
  distributing data to at least one other of the plurality of backhaul interfaces than the preferred backhaul interface if it is determined that the current backhaul demand level exceeds the total backhaul bandwidth capacity of the backhaul connection associated with the preferred backhaul interface.

8. The network node of claim 7, wherein the determination of whether the current backhaul demand level exceeds a total backhaul bandwidth capacity of the backhaul connection associated with the preferred backhaul interface is based on whether the current backhaul demand level exceeds the total backhaul bandwidth capacity of the backhaul connection associated with the preferred backhaul interface by a threshold amount for a threshold time duration.

9. The network node of claim 7, wherein the computer-executable instructions further perform the steps of:
  determining, after distributing data to at least one other of the plurality of backhaul interfaces, whether there is a remainder bandwidth capacity of the total backhaul bandwidth capacity on the backhaul connection associated with the preferred backhaul interface; and
  redistributing data from the at least one other of the plurality of backhaul interfaces to the preferred backhaul interface if it is determined that there is a remainder bandwidth capacity of the total backhaul bandwidth capacity on the backhaul connection associated with the preferred backhaul interface.

10. The network node of claim 2, wherein the monitoring of the current backhaul demand level is based on at least one of a guaranteed bit rate or a maximum bit rate associated with data transmitted to and received from a plurality of subscriber stations.

11. The network node of claim 1, wherein the distribution of data over the plurality of backhaul connections is further based on minimization of a cost function associated with communications on each of the plurality of backhaul connections.

12. The network node of claim 11, wherein the cost function is based at least in part on attributes of the plurality of backhaul connections, the attributes comprising at least one of a financial cost attribute, a communication delay attribute, a communication robustness attribute, or a computational resource attribute, associated with communications on each of the plurality of backhaul connections.

13. The network node of claim 1, wherein each of the one or more data processing modules comprises:
  a user data plane processing module coupled to the network node, the user data plane processing module configured to process user data communications being received and transmitted by the network node; and
  a control plane processing module coupled to the network node, the control plane processing module being configured to process control communications received and transmitted by the network node, and
  wherein the distribution of data over the plurality of backhaul connections is further based on whether the data is associated with the user data plane processing module or the control plane processing module.

14. The network node of claim 1, wherein the received application information associated with the data comprises application class information and specific application information.

15. The network node of claim 1, wherein distributing data over the plurality of backhaul connections is further based on at least one of a bearer or a subscriber station identification associated with data transmitted to and received from a plurality of subscriber stations.

16. The network node of claim 1, wherein the network node is an access node in communication with a plurality of subscriber stations in the communication network.

17. The network node of claim 1, wherein the network node is a backhaul node in the communication network.

18. The network node of claim 1, wherein the network node is a backhaul distribution node in communication with at least one access node and with at least one backhaul node in the communication network.

19. A non-transitory computer-readable medium storing computer-executable instructions which, when executed by a processor, perform a method for backhaul data distribution by a network node that is configured to communicate with a communication network over a plurality of backhaul connections, the method comprising:
  detecting application information associated with data that is communicated to and received from one or more data processing modules; and
  distributing data over the plurality of backhaul connections based at least in part on the detected application information.

20. The computer-readable medium of claim 19, wherein the computer-executable instructions further perform the step of:

monitoring a current backhaul demand level for backhaul bandwidth, wherein the distribution of data over the plurality of backhaul connections is further based on the current backhaul demand level.

21. The computer-readable medium of claim 20, wherein the computer-executable instructions further perform the step of:
 determining whether the current backhaul demand level exceeds a total backhaul bandwidth.

22. The computer-readable medium of claim 21, wherein the step of determining whether the current backhaul demand level exceeds a total backhaul bandwidth is based on whether the current backhaul demand level exceeds a total backhaul bandwidth by a threshold amount for a threshold time duration.

23. The computer-readable medium of claim 21, wherein, if it is determined that the current backhaul demand level exceeds the total backhaul bandwidth, the distribution of data over the plurality of backhaul connections is further based at least in part on minimization of a cost function associated with communications on each of the plurality of backhaul connections.

24. The computer-readable medium of claim 20, wherein the current backhaul demand level is based on at least one of the detected application information, a guaranteed bit rate, or a maximum bit rate associated with data transmitted to and received from a plurality of subscriber stations.

25. The computer-readable medium of claim 20, wherein the step of distributing data over the plurality of backhaul connections further includes:
 initially distributing data to a preferred one of the plurality of backhaul connections;
 determining whether the current backhaul demand level exceeds a total backhaul bandwidth capacity of the preferred backhaul connection; and
 distributing data to at least one other of the plurality of backhaul connections than the preferred backhaul connection if it is determined that the current backhaul demand level exceeds the total backhaul bandwidth capacity of the preferred backhaul connection.

26. The computer-readable medium of claim 25, wherein the step of determining whether the current backhaul demand level exceeds a total backhaul bandwidth capacity of the preferred backhaul connection is based on whether the current backhaul demand level exceeds the total backhaul bandwidth capacity of the preferred backhaul connection by a threshold amount for a threshold time duration.

27. The computer-readable medium of claim 25, wherein the step of distributing data over the plurality of backhaul connections further includes:
 determining, after distributing data to at least one other of the plurality of backhaul connections, whether there is a remainder bandwidth capacity of the total backhaul bandwidth capacity on the preferred backhaul connection; and
 redistributing data from the at least one other of the plurality of backhaul connections to the preferred backhaul connection if it is determined that there is a remainder bandwidth capacity of the total backhaul bandwidth capacity on the preferred backhaul connection.

28. The computer-readable medium of claim 20, wherein the step of monitoring the current backhaul demand level is based on at least one of a guaranteed bit rate or a maximum bit rate associated with data transmitted to and received from a plurality of subscriber stations.

29. The computer-readable medium of claim 19, wherein the distribution of data over the plurality of backhaul connections is further based at least in part on minimization of a cost function associated with communications on each of the plurality of backhaul connections.

30. The computer-readable medium of claim 29, wherein the cost function is based at least in part on attributes of the plurality of backhaul connections, the attributes comprising at least one of a financial cost attribute, a communication delay attribute, a communication robustness attribute, or a computational resource attribute, associated with communications on each of the plurality of backhaul connections.

31. The computer-readable medium of claim 19, wherein the step of detecting application information further comprises:
 identifying user data communications being received from and transmitted to a plurality of subscriber stations; and
 identifying control communications being received from and transmitted to the plurality of subscriber stations,
 wherein the distribution of data over the plurality of backhaul connections is further based on whether the data is associated with the user data communications or the control communications.

32. The computer-readable medium of claim 19, wherein the detected application information associated with the data comprises application class information and specific application information.

33. The computer-readable medium of claim 19, wherein the step of distributing data over the plurality of backhaul connections is further based on at least one of a bearer or a subscriber station identification associated with data transmitted to and received from a plurality of subscriber stations.

34. The computer-readable medium of claim 19, wherein the network node is an access node in communication with a plurality of subscriber stations in the communication network.

35. The computer-readable medium of claim 19, wherein the network node is a backhaul node in the communication network.

36. The computer-readable medium of claim 19, wherein the network node is a backhaul distribution node in communication with at least one access node and with at least one backhaul node in the communication network.

* * * * *